June 5, 1956  I. E. COFFEY  2,748,425
METHOD FOR FORMING CHECK VALVES AND THE LIKE
Filed July 12, 1951  3 Sheets-Sheet 1

INVENTOR.
IRVEN E. COFFEY
BY
*George R. Ericson*
ATTORNEY

June 5, 1956  I. E. COFFEY  2,748,425
METHOD FOR FORMING CHECK VALVES AND THE LIKE
Filed July 12, 1951  3 Sheets-Sheet 2

INVENTOR.
IRVEN E. COFFEY
BY
*George R. Ericson*
ATTORNEY

June 5, 1956 — I. E. COFFEY — 2,748,425
METHOD FOR FORMING CHECK VALVES AND THE LIKE
Filed July 12, 1951 — 3 Sheets-Sheet 3

INVENTOR.
IRVEN E. COFFEY
BY
ATTORNEY

United States Patent Office 2,748,425
Patented June 5, 1956

2,748,425

METHOD FOR FORMING CHECK VALVES AND THE LIKE

Irven E. Coffey, Clayton, Mo., assignor to Carter Carburetor Corporation, St. Louis, Mo., a corporation of Delaware Application July 12, 1951, Serial No. 236,403

7 Claims. (Cl. 18—55)

This invention relates to a novel process for manufacture of a ring-shaped valve disk from rubber or synthetics such as Buna-S compound.

According to previous methods of manufacture, valve disks have been formed by merely punching them out of a sheet of cured rubber. It has been found that valve disks perform more satisfactorily if formed with an annular groove or rib in one surface to serve as a spring seat, and with a rounded peripheral edge to permit better flow of fluid around the periphery. Obviously, such refinements cannot be conveniently provided in a valve disk formed by stamping out of cured rubber. Another disadvantage of this method is that cured rubber does not shear evenly, so that the edges of punched-out disks are sloping or convex or concave, with resulting inaccuracies and lack of uniformity in the finished disk. Moreover, with this method, even though the disks are closely spaced, a large part of the sheet from which they are punched is wasted.

It is therefore an object of this invention to provide means for forming, in a simple sequence of operation, completely and accurately finished ring-shaped valve disks of uniform shape, having an annular groove or ribbed spring seat in one surface and a smooth rolled peripheral edge.

Another object of this invention is to substantially eliminate waste of rubber in the production of valve disks of the type described above.

It is a further object of this invention to provide means whereby a multiplicity of disks or other articles may be simultaneously die-formed from a sheet of rubber or synthetic rubber and all excess rubber severed from the disk portion and removed from the die before curing.

According to this invention, the rubber is first calendered into sheet form, and then coated with a lubricant to prevent sticking. I have found that powdered cetyl acetamide wax sold commercially under the proprietary name of Acrawax C has the desired qualities. This lubricating material remains finely pulverized and non-tacking under normal atmospheric conditions and during storage of the uncured rubber after it has been calendered and coated. The particular material is selected as having a melting point at slightly less than 300° F., actually, about 280° F., so as to be rendered fluid during the curing operation between the forming dies. This causes the material to flow evenly upon the surface of the sheeting during the heating of the dies, thus, fully avoiding the peaks and grains which would be formed otherwise on the dies and the surface of the sheeting material due to the accumulation of powdered wax not having the characteristics of Acrawax. The material maintains its lubricating effect until the curing operation is complete, thereby aiding in separation of the product from the forming dies.

Subsequent to this preparatory step for the sheet material it is drawn between upper and lower platens having disk shaped die portions arranged in spaced rows. The platens or dies are then brought together progressively in such a manner as to grip the sheet and then remove circular portions of the sheet to form the open centers of the ring-shaped valve disks. This step is completed first for reasons that will appear hereinafter.

The next step in the process is to complete the forming operation by clamping the platens and dies together, thereby performing the further steps of squeezing the sheet into the dies to forcibly fill the cavities, form the complete disk, and to sever the sheet along lines between disks and the waste between parallel rows to facilitate the removal of the latter. Next the waste is removed and returned for re-mixing and re-calendering, and the dies are maintained pressed together for about fifteen minutes while heat is supplied at a temperature of about 370° F. to complete a press-curing operation.

After the disks are cured, the platens or dies are separated and the completed valve disks are ejected. Because of the particular sequence of the forming steps, the disks will adhere to one of the platens when the platens are separated, because the hole is punched first and the additional forming steps squeeze the rubber tightly about the punch part of that platen. The punch part is retracted with respect to the die part of the platen, and then the disks may be removed by either a reversal of the movement between the punch and the die parts, or by the application of air pressure from the end of the punch in the direction to blow the disks free of the die. The lubrication provided by the Acrawax C coating, of course, is effective to facilitate the ejection of the disks from the dies. This avoids the use of special tools for stripping, speeds production, avoids accidental damage to the product due to stripping, and produces an all-round product superior to other methods with smoother valve seating sections.

The apparatus employed in the process comprises the usual calendering rolls and means for dispensing a coating of Acrawax C on the sheet as it emerges from the calendering rolls. This apparatus forms the rubber into sheets and coats one side to prevent adhesion between the sheets during rolling and subsequent storage, or prevents adhesion with the dies of the platen. The press has the usual anvil and ram for applying pressure to a pair of platens interposed there-between, one of which is compound and performs a dual function in a progressive manner. This construction has a first platen with a movable die part for punching out the center hole of the valve disk, and a second die part forming the upper valve surface and seat for the spring. The second platen is provided with die portions cooperating with the punch and die portions of the first platen for forming with the second die part above mentioned, the actual surfaces of the valve disk. In addition, it acts with the second die part cooperating therewith to separate the final product from the waste of the sheet.

Referring to the drawings,

Fig. 5 is a sectional view partly broken away, showing the dies and platens separated and the sheet interposed between.

Figure 1:
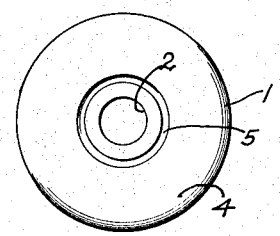
Figs. 1 and 2 are plan and section views respectively of the valve disk body which is the final product.
Figure 2:
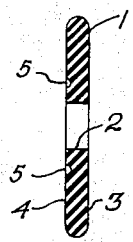

The product formed by the method and apparatus of this invention is shown in Figs. 1 and 2. Referring to these figures, 1 indicates the disk which is provided with a central opening 2. The opposite or upper and lower faces are plane and parallel, the bottom face is indicated as 3, which is actually the seating side of the valve disk. The upper face is similar but is provided with a spring receiving seat indicated as 5. This seat may be of any width deemed desirable but is here shown of only sufficient width to receive the coil of the spring.

Figure 3:
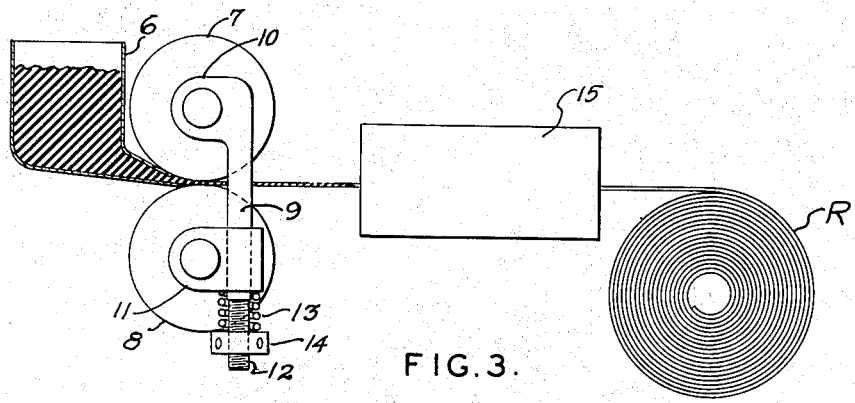
Fig. 3 is a diagrammatic view showing the calendering device and the dispenser for Acrawax.

Referring to Fig. 3, the calendering device is provided with a hopper 6, which receives the rubber and feeds it to a pair of calendering rolls indicated as 7 and 8, which are spring pressed by means of a bracket 9, containing the journal 10 of the upper roll, and extending down through the journal 11 for the bottom roll. The bracket is provided with a stem portion which is threaded at 12 to receive a nut and tensioning device consisting of the spring 13 and thread engaging member 14. By this means the distance between the calendering rolls may be controlled by adjustment of the nut 14 on the threads 12, which will in turn determine the pressure between the calendering rolls. After the rubber strip leaves the calendering rolls, it is provided with a coating of Acrawax, as described in my copending application, Serial No. 783,217, filed October 30, 1947, from coating apparatus diagrammatically indicated by box 15. From here the strip is wound in a roll indicated as R.

Figure 4:
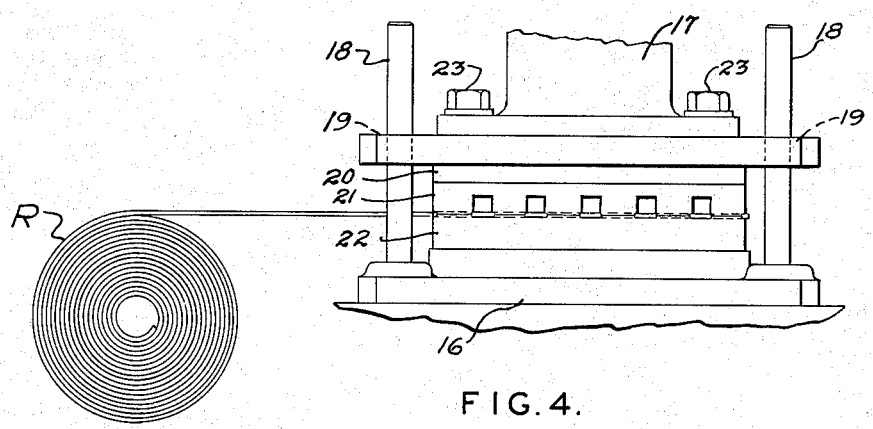
Fig. 4 shows a portion of the press and the platens disposed in the press to receive the sheet material.

Referring to Fig. 4, the press is provided with the usual anvil 16 and ram 17. The ram is movable toward and away from the anvil and is guided in this movement by guides 18 engaging in slots 19 of a face plate mounted on the anvil. Attached to the anvil are the die parts 20 and 21 of the upper platen by means of bolts 23. The platen 22 is attached to the anvil. When the ram is raised, a sheet from the roll R can be inserted between the separated platens. The ram is then lowered toward the anvil, bringing the platens together to perform the molding operation.

Figure 5:
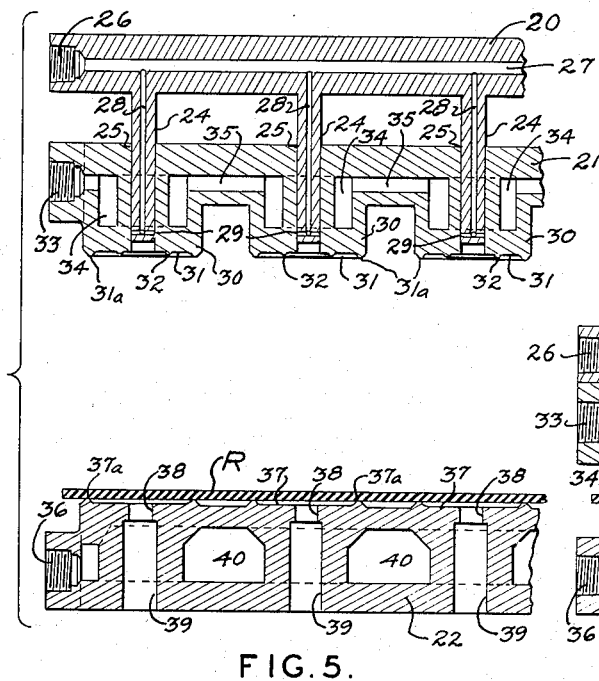

Referring to Figures 5, 6, 7 and 8, they show the individual positions of the progressive stages or steps in the operation of molding the valve disks. Fig. 5 corresponds to a raised position of the ram with respect to the anvil. In this position the die part 20 is shown separated from the intermediate die part 21 and die punches 24 raised within the receiving portions of the dies 25 of the platen 21. In this position the sheet from the roll R is drawn across the lower platen in a position for the subsequent closing of the platen and die members by lowering of the ram 17.

The structural features of the upper die part 20 will now be described. This die has an upper plate-like member drilled with passages 27 transversely thereto and provided with a connection for compressed air supply at 26. Passages 27 connect with a plurality of individual passages through the depending dies 24 on the plate, indicated as 28, which in turn connect with cross passages forming nozzles in the lower tip portion of each of the depending die portions 24, indicated as 29. The die members 24, when in raised position, are held retracted with respect to the die 21 by spring or cam mechanism which forms no part of the present invention and is therefore not shown. Each of the dies 24 in effect is a punch and has the function of forming the central opening in the valve disk member. The lower portion of the die members 24 is formed accordingly to punch out the center hole of the disk.

Figure 12:
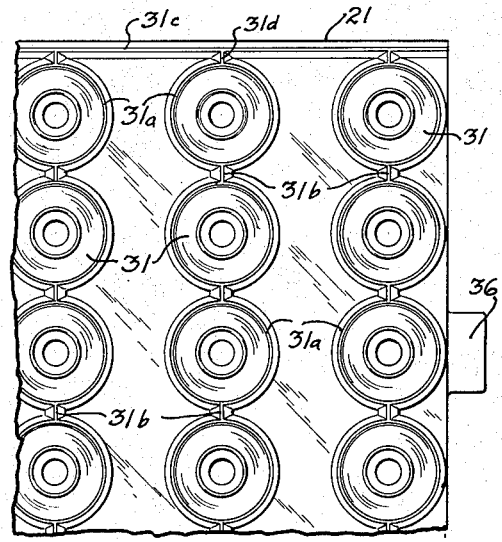
Fig. 12 is a plan view of the die portions of the upper platen.

The lower die 21 has a series of raised die portions 30, formed in the surface of the platen and engaging the rubber strip. Since each of these die members 30 acts to form one-half or approximately one-half of the finished valve disk member, each is provided with a surface complementary to the disk-shaped valve member to be formed as indicated at 31, including an upstanding annular cutting rib 31a. Referring to Fig. 12, it will be noted that die portions 30 are arranged in spaced parallel rows, the die portions forming each row being substantially adjacent each other, with ribs 31a of contiguous die portion connected by a short straight cutting rib 31b. Adjacent and parallel to the edge of the die from which the uncured rubber sheet enters, die 21 is formed with a straight cutting rib 31c connected to cutting ribs 31a of the end die portion 30 by short straight cutting ribs 31d. Rib 32 thereon is for forming the recess to receive the valve spring, which presses the valve disk against the seat. The lower die 21 is also provided with passages for heating the die portions 30, 31 and 32. These heating passages are indicated at 34 and surround or are concentric with the round die member 30. Connecting passages 35 extend between these concentric chambers or passages 34 and a heating connection to a steam line is provided at 33. The lower platen 22 which rests on the anvil of the press is formed with die portions 37, including annular cutting ribs 37a, in its upper surface for molding the rubber to conform with the shape of the lower face of the disk valve.

Figure 11:
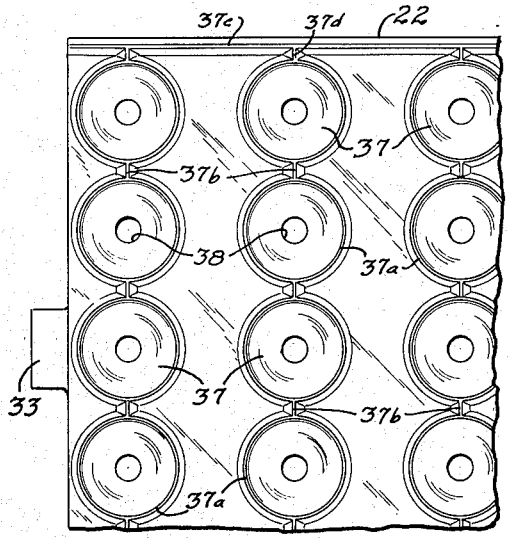
Fig. 11 is a plan view of the die portions of the bottom or lower platen.

Referring to Fig. 11, it will be seen that die portions 37 are arranged in spaced parallel rows, for registry with upper die portions 30, and that annular ribs 37a of contiguous die portions are connected by a short stragiht rib 37b adapted for registry with corresponding rib 31b of the upper die portion. Adjacent and parallel to the edge of the platen from which the uncured rubber sheet enters, platen 22 is formed with a straight cutting rib 37c connected to annular ribs 37a by short cutting rib 37d. The center of the die portions 37 are provided with central openings 38, which receive the punch members 24 in the upper platen. These openings 38 connect with bores 39 of large diameter for a purpose which will be apparent later. Like the upper platen 21, the lower platen 22 is also provided with a connection for steam at 36 and a series of heating passages within the plate-like platen 22 are indicated at 40. These passages surround and heat the adjacent portions of the die members 37.

Figure 6:
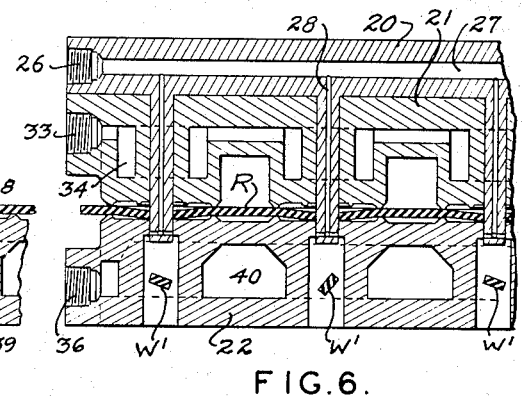
Fig. 6 is a similar view showing the first step in the progressive method of forming the valve disks.
Figure 7:
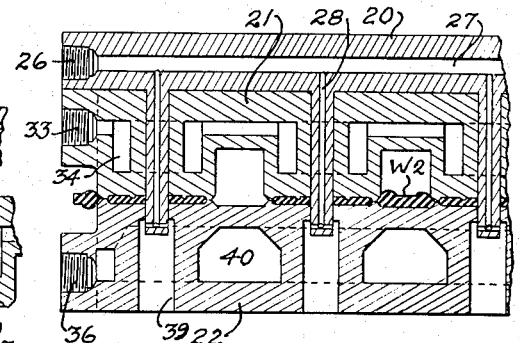
Fig. 7 is a similar view showing the second step and the positions of the dies and platens for forming the valve disks.

Referring now to Fig. 6, it will be seen that the downward motion of the ram with respect to the anvil has performed the first forming operation on the rubber sheet R. The die members of the upper platen 20 have been lowered so that the platens 20 and 21 are in contact. During this lowering process the sheet is first gripped between the dies and then punch members 24 pierce the rubber sheet and press out the central portion to form the open center of the valve disk member. The waste indicated at W1 is shown falling through the lower platen 22. The bores 39 are enlarged with respect to the die punch members 24 and their corresponding receiving openings 38 in the lower platen 22 for this purpose. Like parts of this figure are given the same reference characters, so that their identity may be certain. Referring now to Fig. 7 it will be seen that the second stage of the molding process has been reached when the upper platen 21 contacts the lower platen 22, bringing together the complementary die portions 31 and 37. During this operation the rubber is squeezed tightly within the complementary die portions 31 and 37, so that it is in gripping engagement with the punch elements 24. When the dies are in the position shown in Fig. 7, ribs 31a, 31b, 31c, and 31d of the upper die are in contact respectively with ribs 37a, 37b, 37c, and 37d of the lower die, thereby severing the portion of the rubber sheet between the platens from the remainder of the roll, and also separating waste strips W2 between the parallel rows of dies from each other and from the valve disks. The effect of the squeezing operation is shown quite clearly in the edges of the waste strips W2, one of which is shown at the right hand side of Fig. 7. At this stage of the operation the severed waste strips W2 are pulled out and returned for re-calendering. One of the waste strips in Fig. 7 has already been removed as shown on the left hand side of the figure.

Thus all portions of the sheet which are not to be cured are severed and removed from the die, thereby precluding curing and consequent waste of portions of the sheet not forming part of the valve disks.

Figure 8:
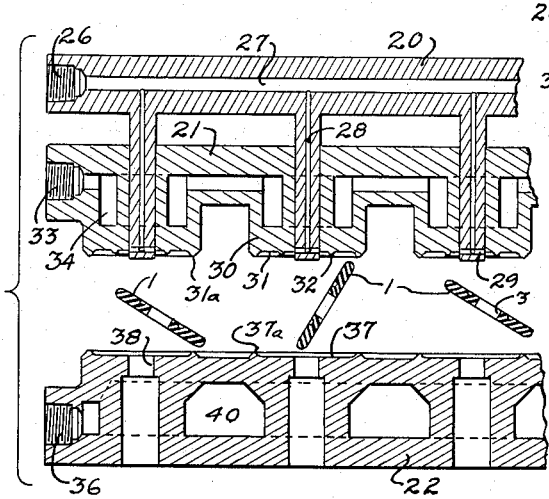
Fig. 8 is a similar view showing the platens separated and the ejection of the valve disks by air blasts.

Referring to Fig. 8, the platens are shown at a stage in their separation. Here the upper platen 20 has reached the position where the nozzles from passages 29 are adjacent the inner surface of the die portion 31. During the separation the air is turned on and flows down through the passages 26, 27 and 28 to separate the valve disk members from the die portions 30. As the platens are separated it will be understood that because of the compression of the valve disk members as shown in Fig. 7, before and during vulcanization the rubber is tightly pressed against the die punch members 24. Therefore, when the dies are separated and the platens moved apart, the disk valve elements will cling to the die punch members 24, so that all of them will be separated from the dies 37. The compressed air merely separates the disks from the plunger die punch elements 24 onto platen 22, and they can be readily swept off the lower platen.

Figure 9:
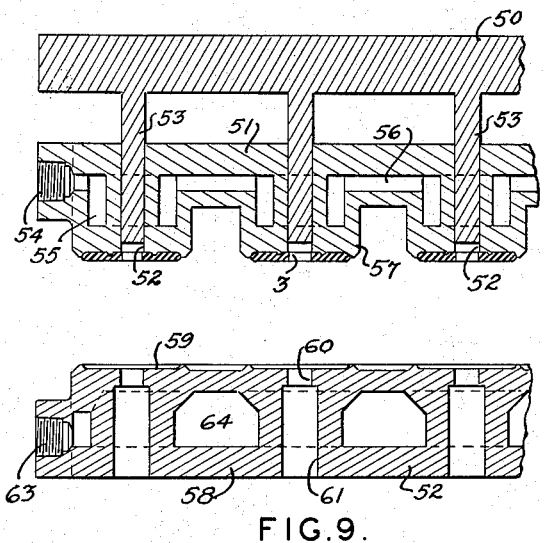
Fig. 9 is a cross-section of the dies and platens of a second modification of the invention shown separated after the disks have been formed.
Figure 10:
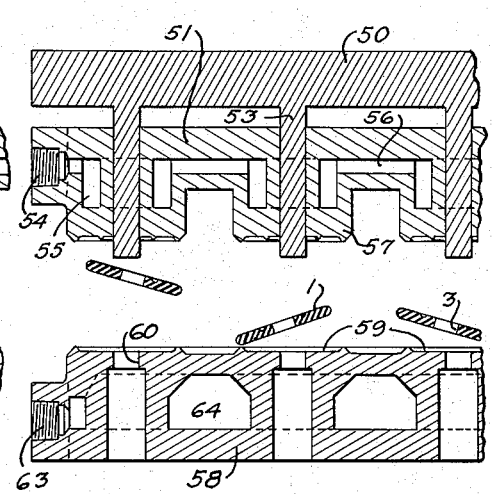
Fig. 10 is a cross-section of the dies and platens partly broken away showing the compound dies ejecting the valve disks from the platen.

Referring now to Figs. 9 and 10, a second embodiment of the apparatus for performing the steps of the method is shown. In this embodiment the use of air to eject the disk elements from the die members on the platen is not necessary for reasons which will appear as the description proceeds. In Fig. 9 a first stage of position of the platen members is shown during the step of separating the platens after the valve disks have been vulcanized. It will be readily apparent with reference to this figure that the platens are provided with similar means of heating and function in a similar manner in forming the valve disks as the previous embodiment, and its is not necessary to illustrate the forming steps. These figures are, therefore, directed merely to illustrate the means and method of separating the valve disks from the die members of the platen. The upper platen 50 is provided with a series of plunger die elements 53 corresponding to those shown as 24 in the preceding embodiment. The other member, platen 51, is provided with openings 52 for receiving the plunger die elements 53. Platen 51 is provided with the usual steam connection 54 and passages 55 as has previously been described. Passages 55 are connected with transverse passages 56, to permit the steam to circulate through the entire platen. Platen 51 is also provided with the die members 57, for forming the complementary upper portion of the valve disk element. Lower platen 58 is formed with similar die members 59, in which are central apertures 60 for receiving the plunger die punches 53. Apertures 60 connect with bores 61 of larger diameter to provide clearance for the waste portion to drop through the platen member. Platen 58 is also provided with the usual steam connections 63 and passages 64, allowing the steam to circulate through the platen and heat each of the die members. It will be noted upon examination that the holes in the disk members, indicated by the reference character 3, are much smaller than the diameter of the punch members 53, which originally formed these openings. This is because of the fact that the openings 3 are first formed by the punch 53 and then subsequently the rubber is squeezed between the complementary die portions on the two platens so that the opening 3 then formed will grip the plunger element tightly. Consequently, then, as shown in Fig. 9, when the platens are separated, the disks will tend to adhere to the upper platen member because of their clinging effect on the die punches 53. Turning now to Figure 10, it will be noted how this characteristic of the disk elements is used for the purpose of stripping the disks from the dies of the upper platen 51. By lowering the punch members after the platens are separated, the disks are easily separated from these upper die members and drop onto the lower platen where they can be swept off. Figs. 11 and 12 show the general arrangement of the die members of the lower and upper platens respectively. It will be noted that the die members are arranged symmetrically in rows transversely of the plate, so that they can be easily connected by the steam passages and so that the waste forming between the rows and indicated as W2 in Fig. 7 may be easily withdrawn by reaching into the clearance provided in the upper platen 21, provided for this purpose. It should be understood that the arrangements illustrated in Figs. 11 and 12 are used both in the platens 21, 22, as well as in the platens 51, 52. Similar reference characters have ben used to indicate the elements of the several figures, but Figs. 11 and 12 carry the reference characters corresponding to those in Fig. 5.

The drawings quite clearly illustrate the several steps of the method about to be described. A first step in the manufacture of the valve disk elements 1 is performed by calendering from the crude rubber a sheet of rubber such as indicated at R. The second step, which is also important, is the coating of the rubber with the Acrawax C. This step is important, since it is vital to the practicing of the method that the separation of the disks from the lower platen be complete and easily accomplished by the gripping action between the punches 53 and the formed valve disk elements. After the sheet is formed, it is drawn between the separated die or platen elements as shown in Fig. 5. The die members are lowered as shown in Fig. 6 and the punch elements strike out the central opening in the valve disk. In Fig. 7 the squeezing operation forming the valve disk between the dies of the upper and lower platen and tightly into an engagement with the punch elements is illustrated. In this figure, it is also shown how the waste strips W2 can be removed from between the rows of forming dies on the platen, as described above. It is important that this waste be recaptured and reclaimed for further use before the vulcanizing step takes place. In the position shown in Fig. 7 the vulcanization is performed, and when complete, the platens are separated in the manner shown in Fig. 8. There the punch elements are withdrawn to put the ports for ejecting air under the upper surface of the valve disk elements, thereby blowing the disk elements free from the dies of the upper platen.

Alternatively, after the vulcanization is complete, the separation and stripping of the valve disks may be accomplished as illustrated in Figs. 9 and 10. There the upper and lower platens are separated and the punch elements are withdrawn from the openings in the formed disk. With the dies and platens separated, the punches are now lowered and, due to the fact that the opening in the valve disk has contracted to a diameter smaller than the plunger of the punch, the disks will be stripped from the upper die portions of the upper platen and fall to the lower platen where they may be swept off. In the case illustrated in Figs. 9 and 10, it is not necessary to use the air for separation of the valve disks as in corresponding Fig. 8. For this reason it may be advantageous to substitute the movement of the corresponding platen members in a manner shown by Figs. 9 and 10, because the stripping operation may be performed in either of the ways illustrated. In either case it is important that some lubricant be used between the rubber sheet and the die elements, and for this reason Acrawax C is initially applied to the rubber strip; otherwise, the stripping operation could not be performed satisfactorily in the way illustrated. Of course, any lubricant suitable for the purpose may be used.

Although the platens are illustrated in the horizontal position, in which it is necessary to use air for sweeping the dislodged disks from the surface of the lower die, it should be noted that the platens may be arranged vertically so that the dislodged disks may be removed by gravity.

It should also be noted that the method disclosed herein may be used in the production of an almost infinite variety of rubber articles, and is not limited to the manufacture of valve disks.

Exclusive use is contemplated of all changes and modifications of the invention disclosed herein, which do not constitute departures from the spirit and scope of the appended claims.

I claim:

1. A method of manufacturing rubber articles comprising the sequence of steps of feeding an uncured rubber sheet coated with a suitable lubricant, gripping the sheet between the dies, punching out a portion of the sheet gripped in the dies while the sheet is gripped, compressing the sheet between the dies to form the articles and to sever the articles from unused portions of the sheet, salvaging the unused portions of the sheet for re-use, applying heat to cure the articles, and then stripping the articles from the dies.

2. A method of manufacturing rubber valve disks comprising the sequence of steps of feeding an uncured rubber sheet coated with a suitable lubricant, gripping the sheet between platens containing spaced parallel rows of dies for forming the disks, punching out the central portions of the sheet within the dies while the sheet is equipped, compressing the rubber between the dies to form the disk contour and to separate the unused strips of the sheet between the die rows from the disk portions and from each other, removing the unused strips for re-use, applying heat to cure the disks, separating the dies, withdrawing the punch, and then stripping the disk by action of the punch.

3. A method of manufacturing rubber valve disks comprising the sequence of steps of feeding an uncured rubber sheet coated with a suitable lubricant, gripping the sheet between platens containing spaced parallel rows of dies for forming the disks, punching out the central portions of the sheet within the dies while the sheet is equipped, compressing the rubber between the dies to form the disk contour and to separate the unused strips of the sheet between the die rows from the disk portions and from each other, removing the unused strips for re-use, applying heat to cure the disks, separating the dies, withdrawing the punch, and then stripping the disk from the dies by forcing air between the disks and the dies.

4. A method of manufacturing rubber valve disks comprising the sequence of steps of feeding an uncured rubber sheet coated with a suitable lubricant, gripping the sheet between platens containing spaced parallel rows of dies for forming the disks, punching out the central portions of the sheet within the dies while the sheet is gripped, compressing the rubber between the dies to form the disk contour and to separate the unused strips of the sheet between the die rows from the disk portions and from each other, removing the unused strips for re-use, applying heat to cure the disks, separating the dies, withdrawing the punch, and then stripping the disks from the dies by withdrawing the punch from the die face and then projecting the punch.

5. A method of manufacturing rubber valve disks comprising the sequence of steps of feeding an uncured rubber sheet coated with a suitable lubricant, gripping the sheet between dies for forming the disks, punching out the central portions of the sheet within the dies while the sheet is gripped, compressing the rubber between the dies to form the disk, applying heat to cure the disks, separating the dies, withdrawing the punch, and then stripping the disk by action of the punch.

6. A method of manufacturing rubber valve disks comprising the sequence of steps of feeding an uncured rubber sheet coated with a suitable lubricant, gripping the sheet between dies for forming the disks, punching out the central portions of the sheet within the dies while the sheet is gripped, compressing the rubber between the dies to form the disk, applying heat to cure the disks, separating the dies, withdrawing the punch, and then stripping the disk from the dies by air pressure.

7. A method of manufacturing rubber valve disks comprising the sequence of steps of feeding an uncured rubber sheet coated with a suitable lubricant, gripping the sheet between dies for forming the disks, punching out the central portions of the sheet within the dies while the sheet is gripped, compressing the rubber between the dies to form the disk, applying heat to cure the disks, separating the dies, withdrawing the punch, and then stripping the disks from the dies by withdrawing the punch from the die face and then projecting the punch.

References Cited in the file of this patent

UNITED STATES PATENTS

| Number | Name | Date |
|---|---|---|
| 1,503,666 | Roberts | Aug. 5, 1924 |
| 1,553,554 | Roberts | Sept. 15, 1925 |
| 1,639,430 | Gammeter | Aug. 16, 1927 |
| 1,793,603 | Frederick | Feb. 24, 1931 |
| 2,442,338 | Borkland | June 1, 1948 |
| 2,548,305 | Gora | Apr. 10, 1951 |
| 2,548,306 | Gora | Apr. 10, 1951 |
| 2,593,667 | Gora | Apr. 22, 1952 |

FOREIGN PATENTS

| Number | Country | Date |
|---|---|---|
| 175,094 | Great Britain | Feb. 16, 1922 |
| 488,422 | Great Britain | July 1938 |